(12) United States Patent
Cheng et al.

(10) Patent No.: US 9,696,615 B2
(45) Date of Patent: Jul. 4, 2017

(54) PROJECTOR AND LIGHT INTEGRATION ROD THEREOF

(71) Applicant: CORETRONIC CORPORATION, Hsin-Chu (TW)

(72) Inventors: Chuan-Te Cheng, Hsin-Chu (TW); Cheng-Ta Miao, Hsin-Chu (TW)

(73) Assignee: CORETRONIC CORPORATION, Hsin-Chu (TW)

( * ) Notice: Subject to any disclaimer, the term of this patent is extended or adjusted under 35 U.S.C. 154(b) by 338 days.

(21) Appl. No.: 13/739,202

(22) Filed: Jan. 11, 2013

(65) Prior Publication Data
US 2013/0250249 A1 Sep. 26, 2013

(30) Foreign Application Priority Data

Mar. 26, 2012 (CN) .......................... 2012 1 0081866

(51) Int. Cl.
*G03B 21/20* (2006.01)
*F21V 8/00* (2006.01)
*H04N 9/31* (2006.01)

(52) U.S. Cl.
CPC .......... *G03B 21/208* (2013.01); *G02B 6/0011* (2013.01); *G03B 21/2066* (2013.01); *H04N 9/3152* (2013.01)

(58) Field of Classification Search
CPC ............ G02B 27/0927; G02B 27/0955; G02B 6/00–6/0096; G03B 21/208; G03B 21/2066; G03B 21/2033; H04N 9/315; H04N 9/3152
USPC ................. 353/30, 37, 34, 94, 102; 362/617
See application file for complete search history.

(56) References Cited

U.S. PATENT DOCUMENTS

| 7,090,357 | B2 | 8/2006 | Magarill et al. |
| 7,161,315 | B2 | 1/2007 | Hsu |
| 7,185,985 | B2* | 3/2007 | Hanano ........................... 353/30 |
| 7,258,451 | B2* | 8/2007 | Wang .............................. 353/99 |

(Continued)

FOREIGN PATENT DOCUMENTS

| CN | 1797065 A | 7/2006 |
| EP | 1398659 A2 | 3/2004 |

(Continued)

OTHER PUBLICATIONS

China Patent Office, "Office Action", Nov. 4, 2014.

*Primary Examiner* — Christina Riddle
*Assistant Examiner* — Christopher Lamb, II
(74) *Attorney, Agent, or Firm* — WPAT, PC (57) ABSTRACT

A projector includes a light source, a light integration rod, a light valve, and a projection lens. The light source provides an illumination beam. The light integration rod has a light incidence end and a light emission end opposite to each other. Through the light incidence and emission ends, the illumination beam is emitted into and out from the light integration rod, respectively. Each of the light incidence end and the emission end is in a rectangular shape. The light incidence end has a first long edge and a first short edge. The light emission end has a second long edge paralleling to the first short edge and a second short edge paralleling to the first long edge. The light valve converts the illumination beam into an image beam. The projection lens is disposed on a transmission path of the image beam. A light integration rod is also provided.

7 Claims, 5 Drawing Sheets

(56) References Cited

U.S. PATENT DOCUMENTS

| | | | |
|---|---|---|---|
| 7,316,484 B2* | 1/2008 | Hatakeyama | G02B 13/0095 348/E5.137 |
| 7,477,799 B2* | 1/2009 | Chang et al. | 382/293 |
| 2001/0028412 A1* | 10/2001 | Ito | H04N 9/3167 349/5 |
| 2001/0033367 A1* | 10/2001 | Karasawa | G03B 21/26 353/30 |
| 2002/0018184 A1* | 2/2002 | Ito | 353/30 |
| 2005/0140933 A1* | 6/2005 | Cannon et al. | 353/37 |
| 2005/0254019 A1* | 11/2005 | Magarill | G02B 27/0927 353/97 |
| 2006/0044523 A1* | 3/2006 | Teijido | G02B 6/0011 353/53 |
| 2006/0062013 A1 | 3/2006 | Imade | |
| 2007/0058143 A1* | 3/2007 | Penn et al. | 353/102 |
| 2008/0094584 A1* | 4/2008 | Chen et al. | 353/97 |
| 2010/0128233 A1* | 5/2010 | Liu et al. | 353/98 |
| 2012/0147330 A1* | 6/2012 | Katou | 353/20 |

FOREIGN PATENT DOCUMENTS

| | | |
|---|---|---|
| JP | 2011-154930 A | 8/2011 |
| TW | I300834 | 1/2008 |
| WO | WO 2011021304 A1 * | 2/2011 |

* cited by examiner

PROJECTOR AND LIGHT INTEGRATION ROD THEREOF

TECHNICAL FIELD

The invention relates to a display device, and more particularly to a projector and a light integration rod thereof.

BACKGROUND

With the advances in technology, projectors are getting more and more popular due to having an improved performance, smaller size and lower price. Consequently, more and more patents related to projectors are disclosed; for example, U.S. Patents (U.S. Pat. No. 6,371,617 and U.S. Pat. No. 7,090,357) and Taiwan Patent (patent No. 1300834) disclose the structures of the projectors.

Figure 1:
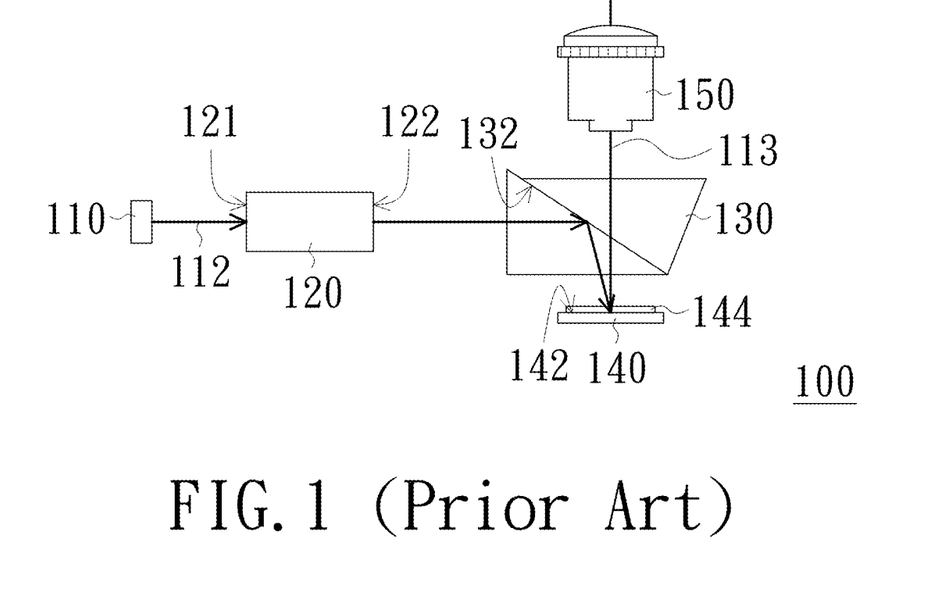
FIG. 1 is a schematic view of a conventional projector.
Figure 2:
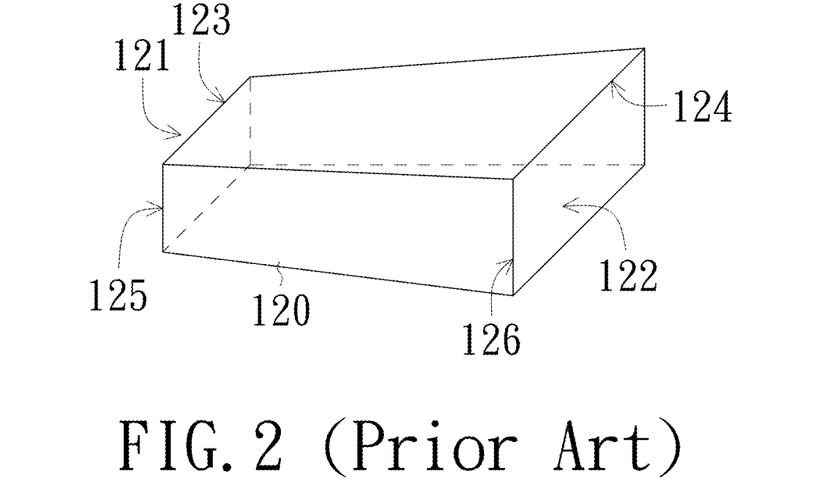
FIG. 2 is a schematic three-dimensional view of a conventional light integration rod.

Please refer to FIGS. 1 and 2 both. The conventional projector 100 includes a light source 110, a light integration rod 120, a total internal reflection prism (TIR prism) 130, a digital micro-mirror device (DMD) 140, and a projection lens 150. The light source 110 is configured to provide an illumination beam 112. The light integration rod 120 is configured to receive the illumination beam 112 and uniformly output the illumination beam 112 to the total internal reflection prism 130 and has a light incidence surface 121 and a light emission surface 122. Each of the light incidence surface 121 and the light emission surface 122 is in a rectangular shape. Specifically, an area of the light emission surface 122 is greater than an area of the light incidence surface 121; the long edge 123 of the light incidence surface 121 and the long edge 124 of the light emission surface 122 are parallel to each other; and the short edge 125 of the light incidence surface 121 and the short edge 126 of the light emission surface 122 are parallel to each other.

The total internal reflection prism 130 has a total reflection surface 132 configured to reflect the illumination beam 112 to the digital micro-mirror device 140. The digital micro-mirror device 140 is configured to convert the illumination beam 112 into an image beam 113. The incidence angle of the image beam 113 relative to the total reflection surface 132 is configured to be smaller than a critical angle, so the image beam 113 passes through the total reflection surface 132 and then further emits into the projection lens 150. The projection lens 150 is configured to project the image beam 113 onto a screen (not shown) thereby forming an image on the screen.

The digital micro-mirror device 140 includes an active area 142 and a protective film 144 covering the active area 142. The active area 142 includes a plurality of micro-mirrors (not shown), and each of the micro-mirrors rotates within +12 degrees and −12 degrees. Specifically, the micro-mirror is operated in an on-state when rotating to +12 degrees, and the on-state micro-mirror is configured to reflect lights into the projection lens 150; alternatively, the micro-mirror is operated in an off-state when rotating to −12 degrees, and the off-state micro-mirror is configured not to reflect lights into the projection lens 150. That is, the light reflected into the projection lens 150 from the on-state micro-mirrors is also referred to as the aforementioned image beam 113. In addition, besides being reflected by the active area 142, a portion of the illumination beam 112 is reflected by the protective film 144.

Figure 3:
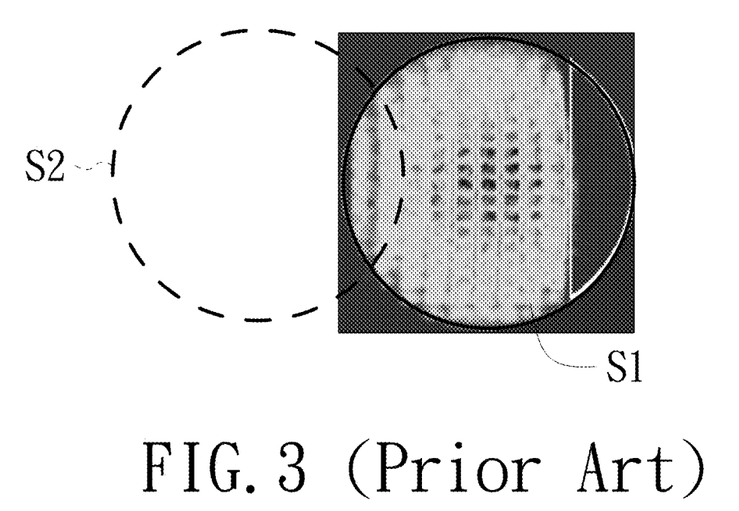
FIG. 3 is a schematic simulation view illustrating the light spot formed in the iris of the projection lens shown in FIG. 1.

Please refer to FIGS. 1 and 3 both. The light spot formed by the image beam 113 is supposed to be in a circle-like shape; however, since a portion of the image beam 113 having a relatively large incidence angle may not successfully pass through the total reflection surface 132 when the image beam 113 emits the total reflection surface 132 of the total internal reflection prism 130 and thereby resulting in light loss, a light-loss area resulted from the total internal reflection prism 130 is occurred on the right side of the light spot S1 formed in the diaphragm of the projection lens 150 consequently.

Figure 4:
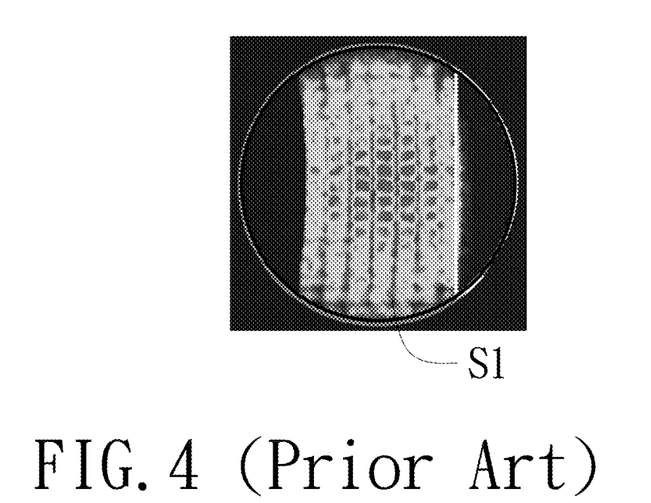
FIG. 4 is a schematic simulation view illustrating the light spot after the projection lens in FIG. 1 is provided with a mask.

In addition, the image beam 113 reflected by the protective film 144 may form another light spot S2 (indicated by the dotted line) partially overlapping the light spot S1; wherein the overlapping area of the two light spots S1 and S2 may result in a stray light in the projection lens 150. In order to eliminate the stray light, a mask (not shown) configured to block the overlapping area of the two light spots S1 and S2 is disposed in the projection lens 150. As shown in FIG. 4, although the stray light is eliminated; however, another light-loss area is accordingly occurred on the left side of the light spot S1. Thus, the conventional projector 100 has relatively poor light utilization efficiency.

SUMMARY OF EMBODIMENTS

Therefore, one object of the invention is to provide a projector for increasing light utilization efficiency.

Another object of the invention is to provide a light integration rod to increase the light utilization efficiency of a projector.

An embodiment of the invention provides a projector. The projector includes a light source, a light integration rod, a light valve, and a projection lens. The light source is configured to provide an illumination beam. The light integration rod has a light incidence end and a light emission end opposite to each other. The illumination beam is emitted into the light integration rod through the light incidence end and emitted out from the light integration rod through the light emission end. Each of the light incidence end and the light emission end is in a rectangular shape. The light incidence end has a first long edge and a first short edge; and the light emission end has a second long edge and a second short edge. The first long edge and the second short edge are parallel to each other; and the first short edge and the second long edge are parallel to each other. The light valve is configured to convert the illumination beam projected on the light valve into an image beam. The projection lens is disposed on a transmission path of the image beam.

Another embodiment of the invention provides a light integration rod. The light integration rod includes a light incidence end and a light emission end opposite to the light incidence end. Each of the light incidence end and the light emission end is in a rectangular shape. The light incidence end has two first long edges and two first short edges; and the light emission end has two second long edges and two second short edges. The first long edges and the second short edges are parallel to each other; and the first short edges and the second long edges are parallel to each other.

In summary, in the light integration rod according to the embodiment of the invention, because the first long edge of the light incidence end parallels to the second short edge of the light emission end and the first short edge of the light incidence end parallels to the second long edge of the light emission end, the shape of the light spot formed by the image beam in the projection lens may be modulated. Thus, the light loss may be accordingly reduced and the light utilization efficiency of the projector may be improved consequently.

BRIEF DESCRIPTION OF THE DRAWINGS

The above embodiments will become more readily apparent to those ordinarily skilled in the art after reviewing the following detailed description and accompanying drawings, in which.

DETAILED DESCRIPTION OF PREFERRED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 5:
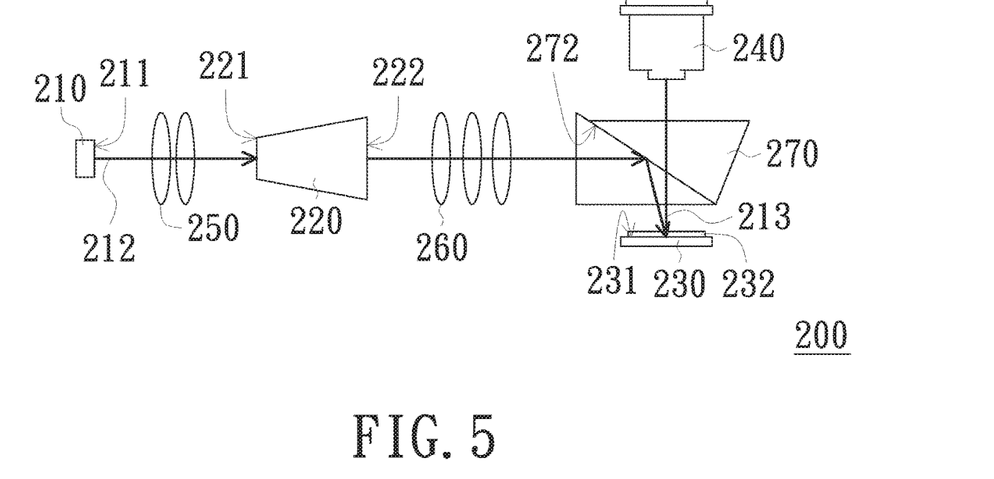
FIG. 5 is a schematic view of a projector in accordance with an embodiment of the invention.

Please refer to FIG. 5, the projector 200 in the embodiment includes a light source 210, a light integration rod 220, a light valve 230, and a projection lens 240. The light source 210 includes a light emitting area 211 configured to provide the illumination beam 212. It merely represents that the illumination beam 212 is the chief ray of optical beams from the light source 210. The light integration rod 220 has a light incidence end 221 and a light emission end 222 opposite to each other. The illumination beam 212 is emitted into the light integration rod 220 through the light incidence end 221 of the light integration rod 220, reflected in the light integration rod 220, and emitted out from the light integration rod 220 through the light emission end 222 of the light integration rod 220. The light valve 230 is configured to convert the illumination beam 212 projected on the light valve 230 into an image beam 213. The projection lens 240 is disposed on the transmission path of the image beam 213 and configured to project the image beam 213 onto a screen (not shown) and thereby forming an image on the screen.

The projector 200 further includes at least one condenser element 250 disposed between the light source 210 and the light incidence end 221 of the light integration rod 220 and located on the transmission path of the illumination beam 212. The condenser element 250 may be a collimating element or other types of optical elements (for example, a condenser lens) and configured to converge the illumination beam 212 on the light incidence end 221 of the light integration rod 220. In addition, the projector 200 may further include at least one lens 260 disposed between the light emission end 222 of the light integration rod 220 and the light valve 230 and located on the transmission path of the illumination beam 212. The lens 260 is configured to converge the illumination beam 212 on the light valve 230. In addition, the projector 200 further includes a total internal reflection prism 270 disposed between the lens 260 and the light valve 230 and located on the transmission path of the illumination beam 212. The total internal reflection prism 270 has a total reflection surface 272 configured to reflect the illumination beam 212 to the light valve 230, and thereby the image beam 213 passes through the light valve 230. Specifically, because the image beam 213 may emit into the total reflection surface 272 with an angle smaller than a critical angle, the image beam 213 may pass through the total reflection surface 272 and further emit into the projection lens 240.

It is to be noted that the numbers of the condenser element 250 and the lens 260 in FIG. 5 are for an example purpose only, and no limitation. In addition, the total internal reflection prism 270 may be omitted in another embodiment; however, it is understood that the positions and angles of the light valve 230, the projection lens 240 as well as other associated devices may need an appropriate adjustment.

The light source 210 includes, for example, a plurality of point light sources (not shown) arranged in an array manner and each of the point light sources may be a light emitting diode or other types of semiconductor light emitting devices; wherein the light emitting area 211 of the light source 210 includes the point light sources. In addition, the projector 200 in the embodiment is exemplified by including one light source 210 only; however, it is to be noted that the projector 200 in another embodiment may include more than one light source 210 and an additional specific optical device (not shown) may be accordingly employed for converging the illumination beams 212 emitted from the light sources 210 to the light integration rod 220. In addition, the light valve 230 is, for example, a reflective light valve such as a digital micro-mirror device or a liquid crystal on silicon panel (LCOS panel) and includes an active area 231 configured to convert the illumination beam 212 into the image beam 213. Specifically, the active area 231 includes a plurality of micro-mirrors (not shown) in the embodiment of the light valve 230 being a digital micro-mirror device; wherein the illumination beam 212 may be reflected by the on-state micro-mirrors and thereby converting the illumination beam 212 into the image beam 213. In addition, the light valve 230 may further include a protective film 232 configured to cover the active area 231. The light valve 230 in the embodiment is exemplified by a reflective light valve; however, it is understood that the light valve 230 may be a transmissive light valve in another embodiment, and accordingly the relative position of the transmissive light valve and the projection lens 240 may need an appropriate adjustment.

Figure 6:
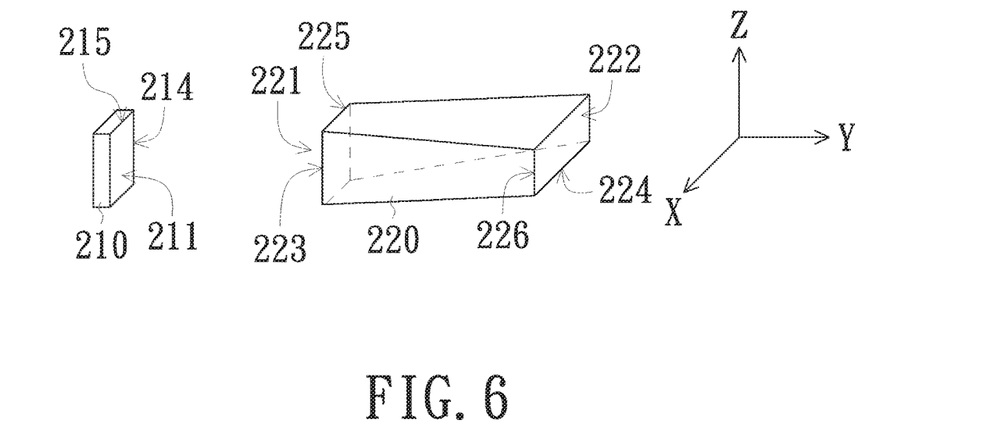
FIG. 6 is a schematic three-dimensional view of the light integration rod and the light source in FIG. 5.

Please refer to FIGS. 5 and 6 both. The light integration rod 220 in the embodiment is exemplified by a solid rod; however, in another embodiment the light integration rod 220 may be a hollow rod constituted by a plurality of plates. In addition, each of the light incidence end 221 and the light emission end 222 of the light integration rod 220 is in a rectangular shape. Specifically, the light incidence end 221 has two first long edges 223 and two first short edges 225, and the light emission end 222 has two second long edges 224 and two second short edges 226; wherein the first long edge 223 and the second short edge 226 are parallel to each other and the first short edge 225 and the second long edge 224 are parallel to each other. Based on the principle of the light incidence end 221 and the light emission end 222 having an equal etendue, when the illumination beam 212 is emitted out from the light emission end 222, the illumination beam 212 is modulated to have a decreasing angle in X-axis direction resulted from increasing length in X-axis direction and an increasing angle in Z-axis direction resulted from decreasing length in Z-axis direction. In other words, the light-emission angle of the illumination beam 212 in X-axis direction (the second long edge 224) is modulated to be smaller than the illumination beam 212 in Z-axis direction (the second short edge 226) and consequently the shape of the light spot is modulated correspondingly. And thus, the light spot formed by the image beam 213 in the projection lens 240 may be also modulated correspondingly.

Figure 7:
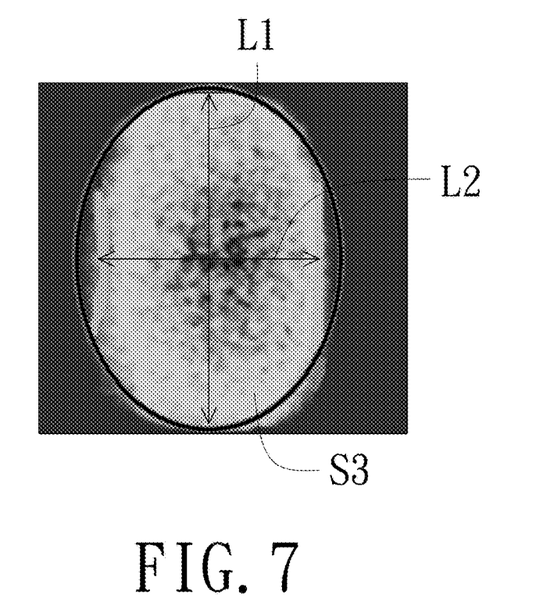
FIG. 7 is a schematic simulation view illustrating the light spot formed in the iris of the projection lens in FIG. 5.
Figure 8:
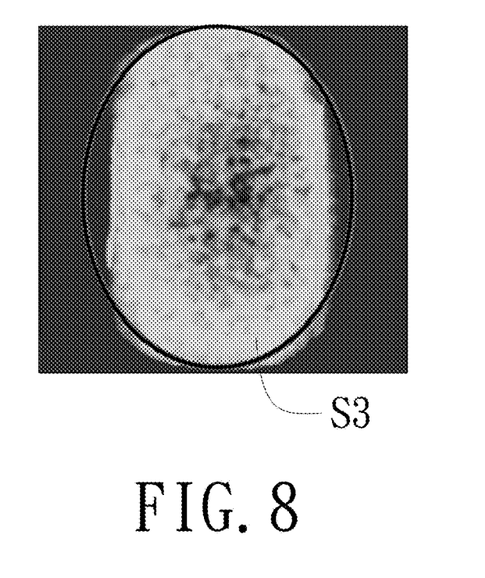
FIG. 8 is a schematic simulation view illustrating the light spot formed in the iris of the projection lens disposed with a mask therein.

Please refer to FIGS. 5 and 7 both. The light spot S3 formed in the diaphragm of the projection lens 240 is in an oval-like shape. In one embodiment, the F number of the light spot S3 in the long-axis L1 is, for example, about F/1.5 and in the short-axis L2 is, for example, about F/2.4. Because the light spot S3 in the embodiment, compared with the light spot being in a circle-like shape in prior art, is modulated in a relatively long and narrow shape, the light loss resulted from the image beam 213 passing through the total reflection surface 272 of the total internal reflection prism 270 may decrease; in addition, the overlaying area of the light spot S3 and the light spot formed by the beams reflected by the protective film 232 also may be reduced or even eliminated. Through comparing FIG. 8 with FIG. 7, it is to be noted that the mask does not affect the size of the light spot S3 much. Thus, the light loss in the embodiment is actually reduced and consequently the projector 200 according to the embodiment may have improved light utilization efficiency.

Figure 9:
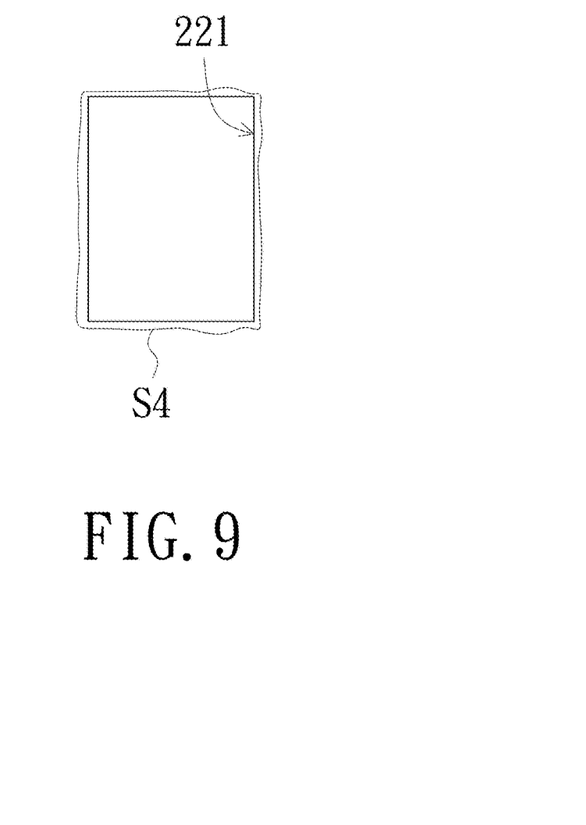
FIG. 9 is a schematic view illustrating the light spot formed by an illumination beam at the light incidence end of the light integration in accordance with one embodiment of the invention.

Please refer to FIGS. 6 and 9 both. In the embodiment, the light emitting area 211 of the light source 210 is in a rectangular shape and has two third long edges 214 and two third short edges 215. Specifically, the third long edges 214 are, for example, corresponding to the first long edges 223 of the light incidence end 221, and the third short edges 215 are, for example, corresponding to the first short edges 225 of the light incidence end 221. Therefore, the illumination beam 212 at the light incidence end 221 may form a light spot S4 having a shape approximately matched to the shape of the light incidence end 221. Thus, the illumination beams 212 may be transmitted into the light integration rod 220 and thereby increasing the light utilization efficiency.

Figure 10:
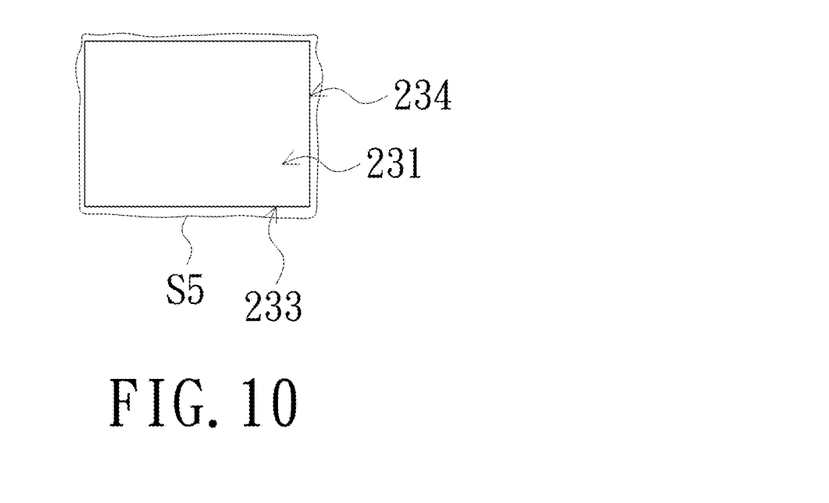
FIG. 10 is a schematic view illustrating the light spot formed by an illumination beam in the active area of the light valve in accordance with one embodiment of the invention.

Please refer to FIGS. 6 and 10 both. In the embodiment, the active area 231 of the light valve 230 is in a rectangular shaped and has two fourth long edges 233 and two fourth short edges 234. Specifically, the fourth long edges 233 are, for example, corresponding to the second long edges 224 of the light emission end 222, and the fourth short edge 234 are, for example corresponding to the second short edges 226 of the light emission end 222. Therefore, the illumination beam 212 in the active area 231 may form a light spot S5 having a shape approximately matched to the shape of the active area 231. Thus, most of the illumination beams 212 may be transmitted into the active area 231 and thereby increasing the light utilization efficiency.

In summary, because the light integration rod according to the embodiments the invention has the first long edge of the light incidence end parallel to the second short edge of the light emission end and has the first short edge of the light incidence end parallel to the second long edge of the light emission end, the light spot formed by the image beam in the projection lens may be modulated to have a relatively long and narrow shape. Thus, the light loss in the invention is accordingly reduced and the projector according to the invention may have improved light utilization efficiency consequently.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims. Moreover, these claims may refer to use "first long edge", "second long edge", "first short edge", "second short edge", etc. following with noun or element. Such terms should be understood as a nomenclature and should not be construed as giving the limitation on the number of the elements modified by such nomenclature unless specific number has been given.

What is claimed is:

1. A projector, comprising:
 a light source configured to provide an illumination beam and comprising a light emitting area in a rectangular shape;
 a light integration rod having a light incidence end and a light emission end opposite to each other, wherein the illumination beam is emitted into the light integration rod through the light incidence end and emitted out from the light integration rod through the light emission end, each of the light incidence end and the light emission end is in a rectangular shape, the light incidence end has a first side and a second side, the light emission end has a third side and a fourth side, the first side and the fourth side are parallel in a first direction, the second side and the third side are parallel in a second direction, wherein the first side is longer than the second side, the third side is longer than the fourth side, the first side is longer than the fourth side, the third side is longer than the second side, and the third side is longer than the first side;
 a light valve configured to convert the illumination beam projected on the light valve into an image beam; and
 a projection lens disposed on a transmission path of the image beam, wherein a length of the light integration rod along the first direction is decreased from the first side to the fourth side, and a length of the light integration rod along the second direction is increased from the second side to the third side, so that a light-emission angle of the illumination beam on the third side is smaller than a light-emission angle of the illumination beam on the fourth side, wherein the light emitting area of the light source has a fifth side and a sixth side, and the fifth side is longer than the sixth side and the fifth side is along to the first direction, and the sixth side is along the second direction, the fifth side is parallel in the first direction, and the sixth side is parallel in the second direction, and the light valve comprises an active area, and the active area is in a rectangular shape and has a seventh side corresponding to the third side and a eighth side corresponding to the fourth side, and a length of the seventh side is longer than a length of the eighth side, wherein the fifth side of the light emitting area corresponds to the eighth side of the active area in the first direction and the sixth side of the light emitting area corresponds to the seventh side of the active area in the second direction.

2. The projector according to claim 1, wherein the light valve is a digital micro-mirror device and comprises a protective film configured to cover the active area.

3. The projector according to claim 1, wherein the light source comprises a plurality of point light sources arranged in an array manner.

4. The projector according to claim 1, further comprising at least one condenser element disposed between the light source and the light incidence end of the light integration rod and located on the transmission path of the illumination beam.

5. The projector according to claim 1, further comprising at least one lens disposed between the light emission end of the light integration rod and the light valve and located on the transmission path of the illumination beam.

6. The projector according to claim 5, further comprising a total internal reflection prism disposed between the lens and the light valve and located on the transmission path of the illumination beam, wherein the total internal reflection prism has a total reflection surface configured to reflect the illumination beam to the light valve, and the image beam passes through the light valve.

7. The projector according to claim 1, wherein the first side of the light integration rod is vertical to an optical axis of the projection lens.

* * * * *